(12) United States Patent
Hagerman et al.

(10) Patent No.: US 8,320,926 B2
(45) Date of Patent: Nov. 27, 2012

(54) METHODS AND ARRANGEMENTS IN A WIRELESS COMMUNICATION SYSTEM

(75) Inventors: Bo Hagerman, Tyresö (SE); Henrik Asplund, Stockholm (SE); Arne Simonsson, Gammelstad (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/265,945

(22) PCT Filed: May 20, 2009

(86) PCT No.: PCT/SE2009/050578
§ 371 (c)(1),
(2), (4) Date: Oct. 24, 2011

(87) PCT Pub. No.: WO2010/134860
PCT Pub. Date: Nov. 25, 2010

(65) Prior Publication Data
US 2012/0046039 A1    Feb. 23, 2012

(51) Int. Cl.
*H04W 72/00* (2009.01)
(52) U.S. Cl. ...... 455/450; 455/115.1; 455/62; 455/67.1; 455/226; 455/561
(58) Field of Classification Search .................. 455/450, 455/62, 67.1, 226, 115.1, 561
See application file for complete search history.

(56) References Cited

U.S. PATENT DOCUMENTS

| | | | | |
|---|---|---|---|---|
| 4,831,384 A | * | 5/1989 | Sefton, Jr. | 342/188 |
| 5,724,666 A | * | 3/1998 | Dent | 455/562.1 |
| 6,411,824 B1 | * | 6/2002 | Eidson | 455/561 |
| 6,697,641 B1 | * | 2/2004 | Shapira | 455/562.1 |
| 7,038,628 B1 | * | 5/2006 | Rausch | 343/702 |
| 7,113,748 B2 | * | 9/2006 | Shapira et al. | 455/63.4 |
| 2002/0164954 A1 | | 11/2002 | Jalali | |
| 2002/0198026 A1 | * | 12/2002 | Niemela | 455/562 |

(Continued)

FOREIGN PATENT DOCUMENTS
EP    1 320 202 A2    6/2003

OTHER PUBLICATIONS

International Search Report, PCT Application No. PCT/SE2009/050578, Feb. 11, 2010.

(Continued)

*Primary Examiner* — Charles Shedrick
(74) *Attorney, Agent, or Firm* — Myers Bigel Sibley & Sajovec, P.A.

(57) ABSTRACT

The present invention relates to methods and arrangements in a wireless communication system that enable the allocation of resources to UEs based on measurements of their antenna polarization, in order to suppress the interference between different UEs at a very low overhead cost. This is achieved by a solution where the scheduling unit retrieves information about the polarization of the UE antenna configurations, and based on this information allocates radio resources to the different UEs, with the aim to minimize the interference. The scheduling unit may retrieve the information from the RBSs or from the UEs. The RBS and the UE will determine the polarization and transmit information regarding this polarization to the scheduling unit. The scheduling unit coordinates the allocation of resources with other scheduling units if necessary.

34 Claims, 9 Drawing Sheets

U.S. PATENT DOCUMENTS

| | | | |
|---|---|---|---|
| 2003/0092402 A1* | 5/2003 | Shapira et al. | 455/101 |
| 2004/0127175 A1* | 7/2004 | Lucidarme et al. | 455/101 |
| 2004/0203538 A1* | 10/2004 | Leppanen et al. | 455/101 |
| 2006/0052066 A1* | 3/2006 | Cleveland et al. | 455/101 |
| 2006/0084395 A1* | 4/2006 | Kezys et al. | 455/101 |
| 2007/0080868 A1* | 4/2007 | Hwang et al. | 343/700 MS |
| 2007/0099578 A1* | 5/2007 | Adeney et al. | 455/69 |
| 2007/0135050 A1* | 6/2007 | Schiff | 455/62 |
| 2009/0227260 A1* | 9/2009 | Anreddy et al. | 455/450 |

OTHER PUBLICATIONS

Alcatel-Lucent: "Further discussion and performance results for DL SU-MIMO Schemes for cross-polarised Antennas", 3GPP DRAFT; R1-072657, $3^{rd}$ Generation Partnership Project (3GPP), Mobile Competence Centre; 650, Route Des Lucioles; F-06921 Sophia-Antipolis Cedex; France, vol. RAN WG1, Orlando, USA, Jun. 19, 2007, 15 pp.

* cited by examiner

METHODS AND ARRANGEMENTS IN A WIRELESS COMMUNICATION SYSTEM

CROSS REFERENCE TO RELATED APPLICATION

This application is a 35 U.S.C. §371 national stage application of PCT International Application No, PCT/SE2009/050578, filed on 20 May 2009, the disclosure and content of which is incorporated by reference herein in its entirety. The above-referenced PCT International Application was published in the English language as International Publication No. WO 2010/134860 A1 on 25 Nov. 2010.

TECHNICAL FIELD

The present invention relates to scheduling in a wireless communication system. More particularly, the present invention relates to a scheduling unit controlling the allocation of radio resources to user equipments, to an RBS serving the user equipment, to a user equipment and to corresponding methods for allocating resources.

BACKGROUND

The Universal Mobile Telecommunication System (UMTS) is one of the third generation mobile communication technologies designed to succeed GSM. 3GPP Long Term Evolution (LTE) is a project within the 3$^{rd}$ Generation Partnership Project (3GPP) to improve the UMTS standard to cope with future requirements in terms of improved services such as higher data rates, improved efficiency, lowered costs etc. The UMTS Terrestrial Radio Access Network (UTRAN) is the radio access network of a UMTS system and evolved UTRAN (E-UTRAN) is the radio access network of an LTE system.

Figure 1A:
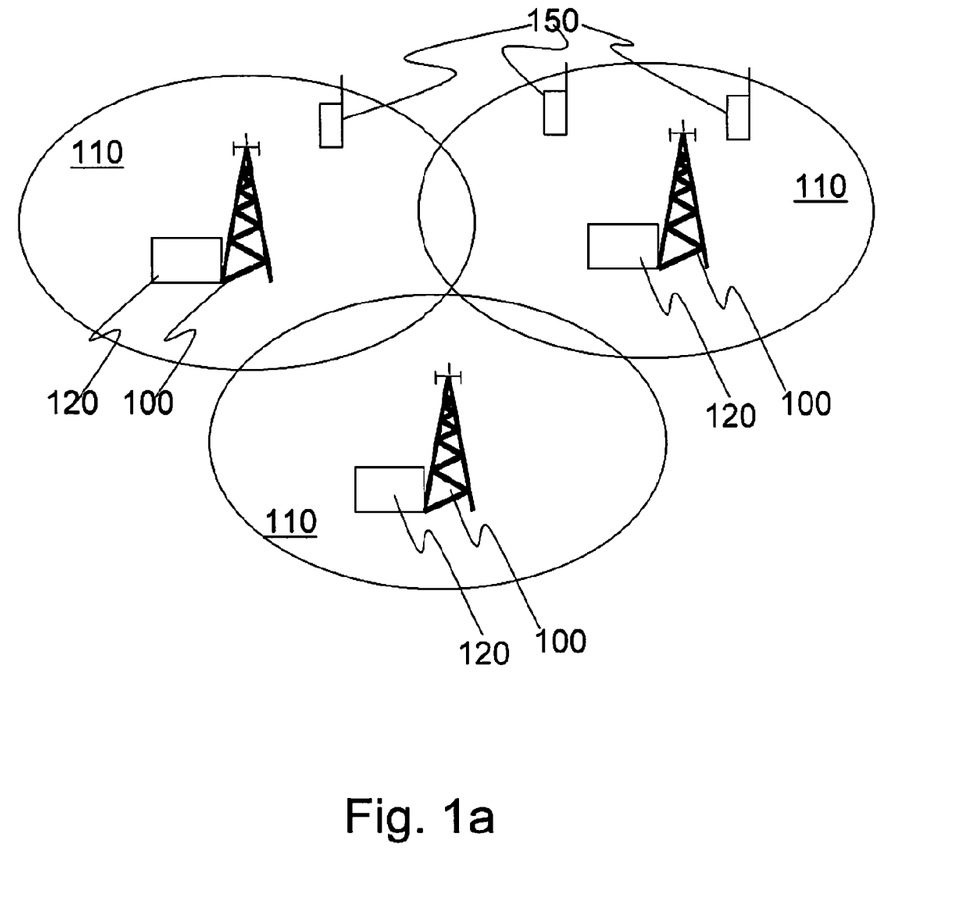
FIG. 1a illustrates schematically a part of a conventional wireless communication system wherein the present invention may be implemented.

As illustrated in FIG. 1a, an E-UTRAN typically comprises user equipments (UE) 150 wirelessly connected to radio base stations (RBS) 100, commonly referred to as eNodeB. In such a wireless communication system, it is desirable to reuse as much of the radio resources in each cell 110 as possible to achieve good spectral efficiency. The radio resources may be e.g. the time slots, the frequencies, the code resources and the transmission power of the radio base stations and the user equipment. In an E-UTRAN, downlink multiplexing is a combination of Time Division Multiplexing (TDM) and Frequency Division Multiplexing (FDM) and resources are thus shared both in the time domain and the frequency domain. The scheduling unit 120, commonly co-located with the eNodeB, controls the allocation of these shared radio resources among the UEs at each time instant, both in uplink and in downlink.

However, whenever a resource is reused this may lead to interference (intra-cell or inter-cell interference) between the links utilizing this particular resource. The scheduling principles thus need to take the interference into account. The scheduling principles, as well as which resources that are shared between UEs, differ depending on the radio interface characteristics, e.g. whether uplink or downlink is considered and whether different users transmissions are mutually orthogonal or not.

Various approaches to manage the interference are known. One possibility is to refrain from using some fraction of the available resources in each cell. By coordination of the resource usage in multiple cells an acceptable interference level can be achieved. Some examples of this approach are frequency reuse, static inter-cell interference coordination (ICIC), and fractional load. A problem with these approaches for managing interference is that they restrict the resources available for scheduling, thus reducing the spectral efficiency as resources are not used optimally in each cell.

Another approach relies on more actively selecting which UEs that can access a particular resource based on channel state information for these UEs. Of all possible UEs, those who interfere the least with each other may be scheduled jointly. Such a scheme can be made possible by having knowledge of the average channel gain on all desired and some interfering links. Some examples are coordinated scheduled beamforming, multipoint/multicell coordinated scheduling and advanced dynamic ICIC. The problem of such a scheme is that it requires accurate measurements of the channel gain to both desired and interfering UEs, which also reduces the spectral efficiency as the measurements use resources that could have been used for payload. Improving the accuracy of the measurements by assigning orthogonal sounding pilots to the different links is also done at the cost of poorer spectral efficiency.

Figure 1B:
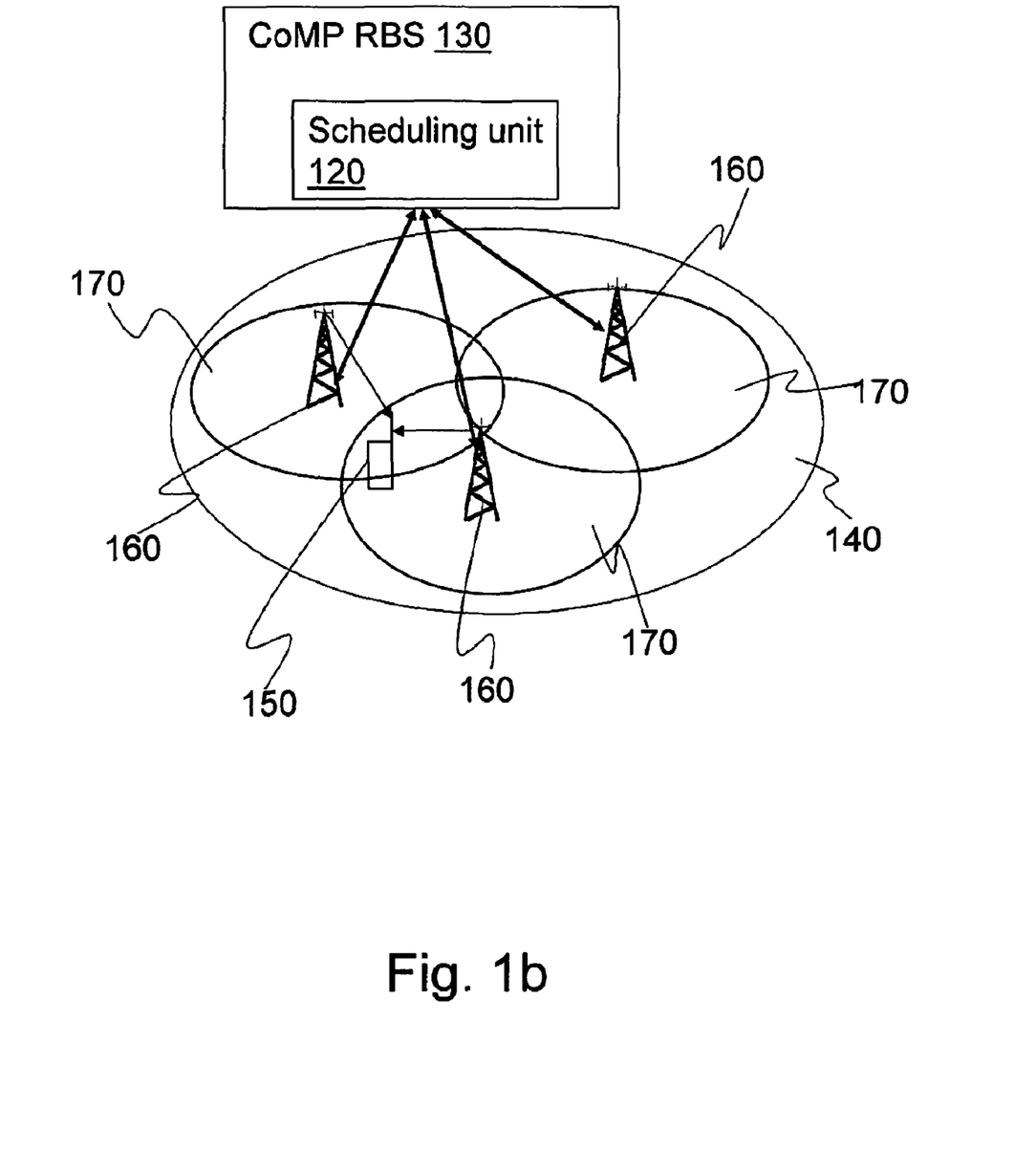
FIG. 1b illustrates schematically a coherent CoMP system wherein the present invention may be implemented.

An even more advanced approach, which is studied for advanced E-UTRAN in 3GPP, utilizes coordinated transmission (or reception) from multiple RBSs to effectively "null" the interference between UEs served by these RBSs, and may also simultaneously to (from) multipoints coherently transmit (or receive) signals to improve performance. One such arrangement is called a coherent CoMP system, which is a network of spatially distributed antenna nodes connected to a common CoMP RBS, that provides wireless service within a geographic area. FIG. 1b illustrates the basic concepts of a CoMP system. The CoMP RBS 130, coordinates the function of all the antenna nodes 160, and the scheduling unit 120 typically co-located with the CoMP RBS, applies different weights to the transmission antennas of the distributed antenna nodes 160 in order to serve the UEs 150. Applying different weights to the transmission antennas implies that the signals to be transmitted on the different antennas are multiplied by different weights, thereby adjusting the phase and/or the amplitude of the signals, in order to shape the overall antenna beam in the wanted direction. This may also be expressed as applying a pre-coding vector to the signal to be transmitted or to the transmitting antenna. The area covered by each antenna node 160 is referred to as a sub cell 170, and the area covered by a CoMP system is referred to as a CoMP cell 140. Typically the UE 150 receives signals from more than one antenna node 160 in a CoMP cell 140.

The problem with such a system is that instantaneous channel knowledge is required to achieve useful gains. This makes this approach very costly in terms of the necessary amount of feed-back to maintain enough channel knowledge, especially in high mobility scenarios.

SUMMARY

The object of the present invention is to achieve methods and arrangements that obviate some of the above disadvantages and enable the allocation of resources to UEs based on their antenna polarization, in order to suppress the interference between different UEs at a very low overhead cost.

This is achieved by a solution where the scheduling unit retrieves information about the polarization of the UE antenna configurations, and based on this information allocates radio resources to the different UEs, with the aim to minimize the interference. The scheduling unit may retrieve the information from the RBSs or from the UEs. The RBS and the UE will determine the polarization and transmit information regarding this polarization to the scheduling unit. The scheduling unit coordinates the allocation of resources with other scheduling units if necessary.

In accordance with a first aspect of the present invention, a method for resource allocation in a wireless communication system comprising at least one RBS serving two or more UEs is provided. Each UE is provided with an antenna configuration comprising a transmitting and a receiving antenna. At least one scheduling unit controls the allocation of radio resources to the UEs. The method comprises the step, performed by a scheduling unit, of retrieving information regarding the polarization of the antenna configuration of at least two of the UEs. It also comprises the step of allocating resources for the at least two UEs based on the retrieved information.

In accordance with a second aspect of the present invention, a method for resource allocation in a wireless communication system comprising at least one RBS serving two or more UEs is provided. Each UE is provided with an antenna configuration comprising a transmitting and a receiving antenna. At least one scheduling unit controls the allocation of radio resources to the UEs. The method comprises the step, performed by a RBS, of retrieving information regarding the polarization of the antenna configuration of at least two of the served UEs. It also comprises the step of transmitting the retrieved information to a scheduling unit in order for the scheduling unit to use the retrieved information when allocating resources.

In accordance with a third aspect of the present invention, a method for resource allocation in a wireless communication system comprising at least one RBS serving two or more UEs is provided. Each UE is provided with an antenna configuration comprising a transmitting and a receiving antenna. At least one scheduling unit controls the allocation of radio resources to the UEs. The method comprises the step, performed by a UE, of determining the polarization of the antenna configuration. It also comprises the step of forwarding information regarding the determined polarization to a scheduling unit, in order for the scheduling unit to use the forwarded information when allocating resources.

In accordance with a fourth aspect of the present invention, a scheduling unit for a wireless communication system is provided. The system comprises at least one RBS serving two or more UEs. Each UE is provided with an antenna configuration comprising a transmitting and a receiving antenna. The scheduling unit is arranged to control the allocation of radio resources to UEs. It comprises a retrieving unit for retrieving information regarding the polarization of the antenna configuration of at least two of the UEs, and an allocating unit for allocating resources for the at least two UEs based on the retrieved information.

In accordance with a fifth aspect of the present invention, a RBS for a wireless communication system is provided. The system comprises a scheduling unit controlling the allocation of radio resources to UEs. Each UE is provided with an antenna configuration comprising a transmitting and a receiving antenna. The RBS is arranged to serve the UEs and comprises a retrieving unit for retrieving information regarding the polarization of the antenna configuration of at least two of the served UEs. It also comprises a transmitter for transmitting the retrieved information to a scheduling unit in order for the scheduling unit to use the retrieved information when allocating resources.

In accordance with a sixth aspect of the present invention, a UE for a wireless communication system is provided. The system comprises at least one RBS serving UEs of the system and at least one scheduling unit controlling the allocation of radio resources to the UEs of the system. The UE is provided with an antenna configuration comprising a transmitting and a receiving antenna, and further comprises a determining unit for determining the polarization of the antenna configuration, and a forwarding unit for forwarding information regarding the determined polarization to a scheduling unit, in order for the scheduling unit to use the forwarded information when allocating resources.

An advantage of embodiments of the present invention is that they allow for a certain degree of interference coordination with limited or even no channel feedback. The gain from this coordination is an increased isolation that may be in the order of 5-15 dB for UEs with predominantly VP or HP antennas.

A further advantage of embodiments of the present invention is that they provide very good robustness against UE mobility speed as the antenna polarizations are not dependent on speed, only orientation.

Still another advantage of embodiments of the present invention is that a part of the coherent CoMP system gain is possible with only 2 bits/s channel feedback.

DETAILED DESCRIPTION

In the following, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it will be apparent to one skilled in the art that the present invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

The present invention is described herein by way of reference to particular example scenarios. In particular the invention is described in a non-limiting general context in relation to a 3GPP LTE system. It should though be noted that the invention and its exemplary embodiments may also be applied to other types of radio access technologies such as UTRAN, WiMax and GSM.

In the present invention, the problem of keeping a high spectral efficiency while suppressing interference is addressed by a solution using UE antenna configuration polarization information for the allocation of radio resources to the UEs. This makes it possible to suppress interference between different UEs at a very low overhead cost.

Polarization is a property of waves that describes the orientation of their oscillations. It is known that a wireless channel will maintain aspects of the polarization state of a transmitted wave even in non-line-of-sight situations. A transmitted vertically polarized wave will thus keep its vertical polarization (VP) throughout the propagation to a receiving side with a very limited cross-polarization scattering. Due to this limited amount of cross-polarization scattering in the radio channel, the vertical-to-vertical and horizontal-to-horizontal polarization combinations (transmitting antenna and receiving antenna polarization combination) provide an equal received signal power on average, while the cross-polarized combinations (vertical-to-horizontal or vice versa) typically provide 5-15 dB weaker received signal power. A signal provided by an RBS with a VP transmission antenna will thus be received as a stronger signal in a UE with a VP receiving antenna (i.e. a vertical-to-vertical polarization combination) than in a horizontally polarized (HP) receiving antenna (vertical-to-horizontal polarization combination). This means that in order to obtain less interference between a UE in one cell and the potentially strongest co-channel interferer in a neighboring cell, a vertical-to-vertical polarization combination for one of the UEs and a horizontal-to-horizontal polarization combination for the other UE, so called polarization orthogonality, should be used. For UEs in neighboring cells within the same site, having very closely mounted serving RBS antennas, the polarization orthogonality can be expected to be close to ideal.

The unit responsible for the allocation of radio resources will hereinafter be referred to as the scheduling unit. In the example of an E-UTRAN, such as the one illustrated in FIG. 1a, there is one scheduling unit 120 per eNB 100 (the scheduling unit and the eNB typically co-located with each other), and the scheduling unit 120 allocates resources for the respectively served UEs 150 both in downlink and uplink. For uplink the control of the UE transmission activity is based on scheduling grants sent from the scheduling unit to the UEs. In FIG. 1b, illustrating a CoMP system, the scheduling unit of the present invention is typically co-located with the CoMP RBS 130, and is responsible for applying the weights to the transmission antennas for each of the distributed antenna nodes 160.

Figure 2:
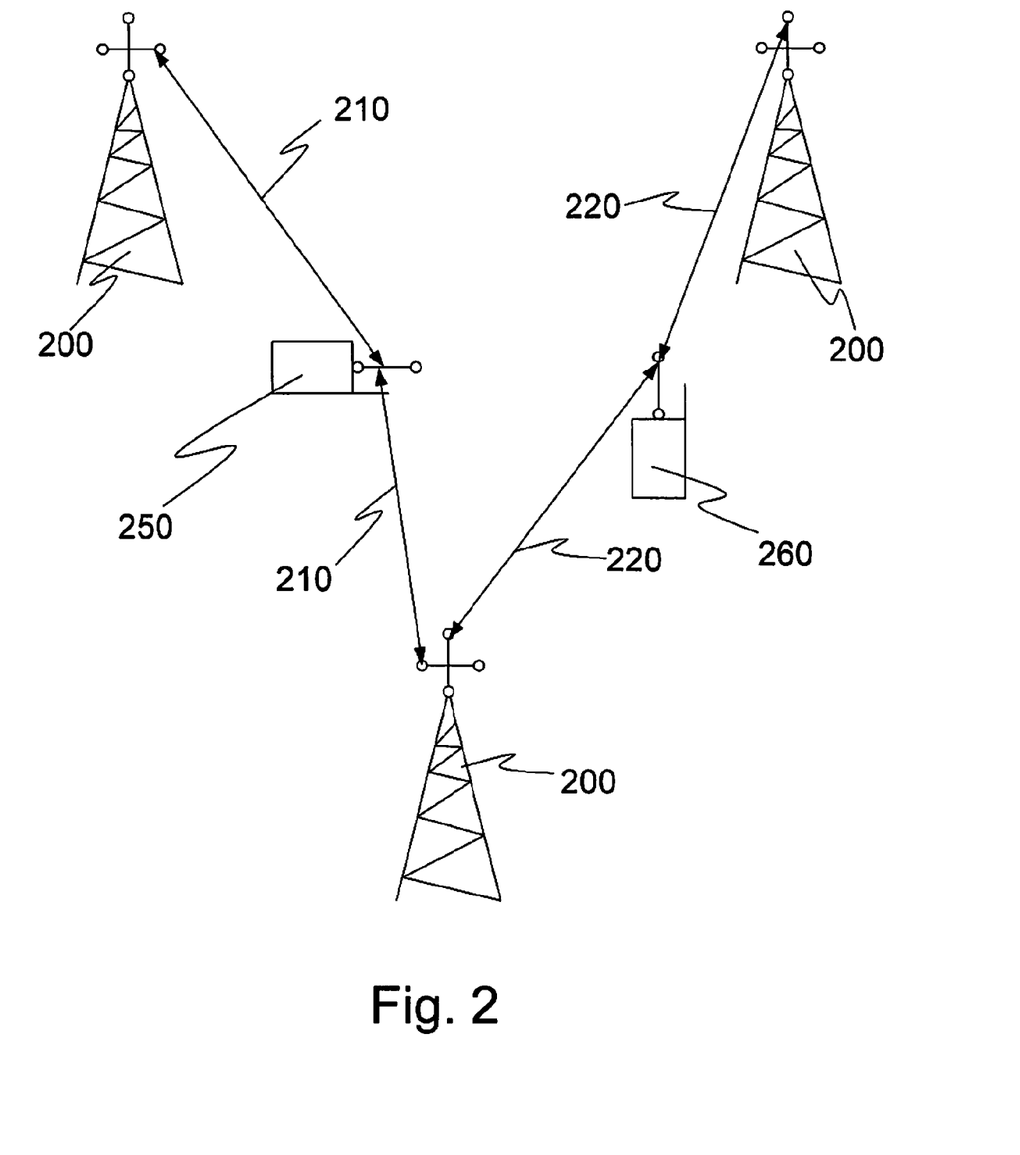
FIG. 2 illustrates schematically the basic idea of the polarization based scheduling of the present invention.

As illustrated in FIG. 2, a UE 260 with a VP antenna could benefit from being scheduled to transmit to or receive from RBSs 200 utilizing a transmission mode that results in a VP channel 220 (vertical-to-vertical polarization combination), jointly with a second UE 250 that has a horizontal HP antenna and that is scheduled to RBSs utilizing a HP transmission mode resulting in a HP channel 210. The interference suppression between the two UEs will be an additional 5-15 dB compared to if the two UEs would both have been using the same polarization combination (i.e. non-orthogonal polarization). UEs do not always have pure VP or HP antennas but could instead have a more random polarization (a mixture of HP and VP). In the case of multiple UEs it could be beneficial to specifically pair UEs with pure VP and HP, while those UEs having more random polarizations would require a more exclusive use of the radio resources due to that a poorer isolation is possible based on the polarization.

In a basic form, the present invention consists of determining the polarizations of the UE antenna configurations and forwarding information regarding the polarization to the scheduling unit. The determination and forwarding of polarization information can be done either continuously, at regular intervals or in response to a query from the scheduling unit. Another possibility is that it is triggered by an event, e.g. the UE may be triggered to forward the polarization information when the antenna polarization is substantially changed, or when there is data to transmit from/to this UE. The scheduling unit can then use this retrieved polarization information when allocating resources to the different UEs. The decision of what UEs to schedule jointly can for example be influenced by the UEs' antenna polarizations, as described above. As another example, two UEs with strong interference relations and low antenna polarization orthogonality can be scheduled on different resource blocks in time or frequency. It is also possible to sort interfering UEs based on the polarization orthogonality, and thus to use this polarization orthogonality when scheduling and allocating resources in order to minimize the co-channel interference.

In one embodiment of the present invention, more than one scheduling unit controls the allocation of resources to the UEs for which the antenna polarization is determined. In order to allocate resources to these UEs in an optimal way, the different scheduling units need to coordinate the allocation of resources with each other. In the E-UTRAN of FIG. 1a for example, the allocation of resources to UEs in neighboring cells is handled by different scheduling units (typically co-located with the eNodeBs), which thus implies that a coordination between these scheduling units is needed in order to e.g. obtain polarization orthogonality for UEs in neighboring cells. This is valid both for uplink and downlink scheduling. This coordination implies a transfer of polarization information between the scheduling units, which may for example be done over the existing X2 interface between eNodeBs in E-UTRAN. The X2-interface solution may require an additional standardized procedure to the existing Overload Indicator and High Interference Indicator.

The invention can be applied in different types of networks and for different sizes of clusters, and it may be used for either uplink or downlink. In one exemplary embodiment valid for the allocation of resources for LTE downlink, it is the UE receiving antenna polarization that is retrieved, and the allocation of resources will in that case comprise a control of the RBS transmitting antenna based on the retrieved polarization information. If the UE receiving antenna is determined to be VP, then the RBS VP transmitting antenna should be chosen for the transmission to that UE, while the RBS HP transmitting antenna should be chosen for the transmission to a UE with HP receiving antenna. In an alternative exemplary embodiment valid for the allocation of resources to a UE in e.g. LTE uplink, where the UE has more than one transmitting antenna in its antenna configuration, the information regarding the polarization of these UE transmitting antennas is retrieved and is used for controlling the UE transmitting antennas. The invention may also be used in a CoMP system with distributed antenna nodes, and the control of the transmitting antennas will in that case correspond to a setting of transmission antenna weights to obtain the wanted transmission antenna polarization. In still another exemplary embodiment, the invention is used to decrease the uplink interference between users within a single cell, e.g. in a system using multi-user MIMO, by pairing UEs with polarization orthogonality for uplink transmission.

There is a great advantage to use the polarization information as a basis for the allocation of resources, especially in a CoMP system. The CoMP RBS needs to get updated on all the served UEs channel information continuously to keep the interference level acceptable, which implies a very large amount of signaling. Replacing this large amount of channel information with the UE polarization information will reduce the amount of signaling needed drastically. Since the UE antenna polarization in many situations can be expected to vary slower than the other fast fading variations, the signaling needed in the present invention can be kept low. With only 2 bits/s the polarization based allocation of resources can improve the interference level significantly. This can be compared to closed-loop pre-coding with signaling in the order of 400 bits/s (4 bits every 10 ms) and coherent CoMP with signaling in the order of thousands of bits/s.

When two users have been scheduled for simultaneous transmission based on their polarization orthogonality it is important that the transmission formats that are used preserve this orthogonality. Consider two UEs A and B, where A has two vertically polarized antennas while B has one vertical antenna and one horizontal antenna. It is evident that orthogonality can be maintained if B refrains from transmitting any signals from its VP antenna. The scheduling decision to allow A and B simultaneous access to a radio resource may then be conditioned on a certain restriction on B's transmission format. If A had instead been equipped with two horizontally polarized antennas then a different restriction for B would be necessary. This restriction of transmission format is optional or can be less restrictive letting other criteria control the polarization. A scheduling grant may therefore be accompanied with a "polarization grant" that specifies what polarizations that are allowed to be used on the scheduled resource.

As cross-polar scattering is minimized for transmission from VP or HP polarized antennas, it would also be beneficial to arrange the RBS antennas such that the pre-coding vectors will result in VP and HP modes of transmission, in order to gain the full potential of polarization based scheduling. Even though the actual physical RBS antennas are not pure VP and HP antennas but rather antennas with cross polarization, they can be arranged to transmit VP and HP signals by applying different weights to the signals (or pre-coding vectors) transmitted from the antennas.

The method for suppressing interference according to the present invention can be used as a pure polarization scheduling principle as described in the examples above, i.e. that it is only the polarization information that is used as input when deciding the allocation of resources. However, it is also possible to use the polarization information as a complement to other factors that may influence the allocation of resources. In that case the polarization orthogonality may e.g. be introduced as a weighted scheduling factor, similar to Channel Quality Index weighting in proportional fair scheduling.

In one first embodiment of the present invention, it is the RBS that retrieves the information regarding the polarization of the antenna configurations of its served UEs, and transmits this information to the scheduling unit in order for it to use the information when allocating resources to the UEs. The UE antenna configurations comprises at least one transmitting antenna and one receiving antenna. In LTE a typical UE antenna configuration is one transmitting and two receiving antennas.

In one alternative of this first embodiment, the UE transmission antenna polarization is determined by the RBS, based on a measurement of the received signal strength for each polarized RBS receiver antenna. If the RBS has at least two receiving antennas with orthogonal polarizations, it may combine these orthogonal polarizations by applying different weights to the antennas into any polarization (hereinafter called a virtual antenna polarization) and measure the signal strength of the UE signal for each combination. The polarization resulting from the combination providing the highest received signal strength thus corresponds to the polarization of the UE transmitting antenna.

In order to limit the signaling to the scheduling unit, the determined antenna polarization can be quantized into two or more polarization states. Another purpose of the quantizing is to enable easy pairing of UEs in orthogonal polarization. The simplest quantization is to classify each UE antenna into one of two states: VP state or HP state. This results in only 1 bit signaling. In addition to the VP and HP state, a state indicating that the polarization is a mixture of VP and HP may be added. This state can also be used when the polarization is not persistent in time, and the state is referred to as the mixed polarization state. The decision on what polarization state an antenna should have can be made by using a threshold x given in dB. If e.g. the received signal strength for a virtual HP antenna is at least x dB stronger than the received signal strength for a virtual VP antenna or the opposite, then the UE transmitting antenna should be given the HP state/VP state. Otherwise it should be given the mixed polarization state.

A UE may also have more than one antenna for receiving and/or transmitting, and for this situation a fourth polarization state can be added, referred to as the either polarization state. This state indicates that one of the antennas of the UE is VP and the other one is HP, and the UE is thus capable of receiving and/or transmitting either of the polarizations. Further extension of the number of polarization states is possible, adding for example states for covering frequency selective full VP/HP power ratio with relative phase information. This will increase the needed signaling, but will give more accurate definitions of the polarization states.

In another alternative of the first embodiment described above, it is the UE receiving antenna polarization that is to be retrieved in order to allocate resources to the UEs in downlink. This is a done by measuring the UE transmitting antenna and quantizing it as described above and by estimating the UE receiving antenna polarization states to be equal to the UE transmitting antenna polarization state. This is thus just an estimation, but is a good estimation if the same antennas are used for both uplink and downlink.

In a second embodiment of the present invention it is the UE that is asked by the scheduling unit to determine the polarization of its antenna configuration. The UE will forward the information regarding the polarization to the scheduling unit in order for the scheduling unit to use the information when allocating resources to the UEs. The advantage of this alternative is that it gives a more accurate information about the UE receiving antenna polarization when the UE receiving antenna is not the same as the UE transmitting antenna or when the number of transmitting and receiving antennas is not the same, as this means that the UE transmitting antenna polarization does not correspond to the UE receiving antenna polarization.

Furthermore, there are also optional UE transmission antenna hopping modes for UEs with two transmission antennas in LTE. In one mode the antenna to use is selected by the eNodeB, and in the other mode the UE is autonomous, i.e. the UE selects which antenna to use without any control from the eNodeB. The first eNodeB selected antenna mode can be used for UE antenna specific polarization measurements, but the second autonomous method will not provide any guidance.

Since these modes are optional, the functionality will not exist in all UEs, but the system will know which UEs that support this functionality.

In an LTE system, the scheduling unit is typically co-located with the RBS and the polarization information determined by the UE is forwarded to the scheduling unit via the RBS. It would also be possible to co-locate the scheduling unit with the UE, which would mean that the forwarding of the polarization information does not include the RBS. This could be envisaged in a wireless communication system where the UE controls the allocation of resources instead of the network.

In one alternative of the second embodiment, the UE determines its receiving antenna polarization based on measurements of the pilot signals sent from the serving RBS transmission antennas and quantizes the polarization, in analogy with what is done in the RBS when measuring the UE transmitting antenna polarizations (see description above). A pilot signal in UTRAN is the Common Pilot Channel (primary and secondary). In LTE the pilot signal corresponds to the different reference signals. If information about the transmitting antenna polarization is needed, the transmission antenna polarization state is estimated to be equal to one (or several) receiving antenna polarization state. It is also possible that the UE has knowledge about its own polarization without actually needing to measure it. One example could be that the UE is equipped with motion sensors that detect the orientation of the UE.

When the present invention is used for reducing interference between the UEs that are close to the cell borders in a single site comprising two or more sector cells, the polarization states may be retrieved per site. However, in some situations, most notably for predominantly VP or HP UE antennas, it can be expected that the polarization state of the UE antennas will be similar with regard to multiple sites. This can be used to reduce the number of needed measurements. Instead of measuring in each site, the information regarding the UE polarization retrieved by one RBS may be signaled to the neighboring RBSs. In LTE this could e.g. be done via the X2 interface.

According to one embodiment of the present invention, the polarization is measured for at least two different frequencies, as the polarization may vary over the frequency band. This may be applied when the used frequency band is wide or if two separate frequency bands are used, and makes it possible to take frequency selective polarization into account when allocating resources. Such a frequency selective measurement may alternatively be signaled as one wideband mixed polarization state, in case the polarization is not persistent for the whole bandwidth.

In one exemplary embodiment of the present invention, the wireless communication system is an LTE system and the scheduling unit and the eNodeB are co-located. When allocating resources to the UEs in downlink, information about the UE receiving antenna polarization is needed. According to one of the alternatives of the second embodiment described above, the UE determines its receiving antenna polarization based on measurements of the pilot signals sent from the serving RBS transmission antennas. That information is then quantized into one of the possible polarization states described above, and forwarded to the scheduling unit co-located with the eNodeB. One alternative for transmitting this information is to use the existing Pre-coding Matrix Indicator (PMI). With two polarized RBS antennas the PMI solution results in four bits signaling with rank 1 restriction (closed-loop pre-coding) and six bits with rank 2 enabled (closed-loop spatial multiplexing). One advantage of such a solution is that the UE is unaware of the antenna configuration polarization scheduling.

As an alternative to using the PMI for the signaling, an additional specific transmission mode can be introduced. The advantage of this alternative is that the signaling is reduced to one or two bits only as two bits would be enough for the solution. With two bits it is possible to signal at least the VP state, HP state and mixed polarization state.

When information on the polarization states of the UEs is known in the network, this can be used to improve other functions as well, such as handover, admission and congestion control, and cell selection. The allocation of resources done by the scheduling unit, will e.g. for handover comprise a control of the serving RBS, i.e. a choice of serving RBS, based on the polarization information. The allocation of resources need to be coordinated between the scheduling units of the handover candidate RBSs. For admission and congestion control, specific UEs will not be allocated any resources, based on their polarization.

Figure 3A:
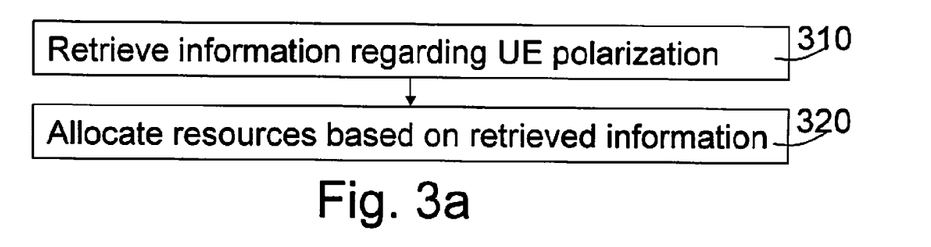
FIGS. 3a-d are flowcharts of the methods performed by the scheduling unit according to embodiments of the present invention.

FIG. 3a is a flowchart for the method comprising the steps performed by the scheduling unit according to a first embodiment of the present invention. It comprises the steps of retrieving 310 information regarding the polarization of the antenna configurations of at least two UEs, and allocating 320 resources to these different UEs based on the retrieved information. The antenna configuration of a UE comprises at least one receiving and one transmitting antenna.

Figure 3B:
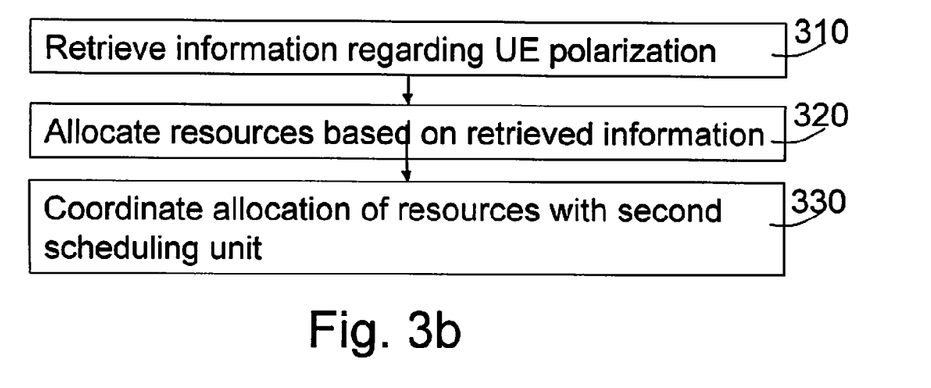

FIG. 3b is a flowchart for the method of the scheduling unit, according to a second embodiment of the present invention. It comprises the steps of the first embodiment described above with reference to FIG. 3a, and one additional step of coordinating 330 the allocation of resources with a second scheduling unit. This is needed when the allocation of resources to the UEs are controlled by different scheduling units. The scheduling units will then have to communicate relevant polarization information to each other so that the allocation of resources is coordinated. The communication may e.g. be done via the X2 interface in the case of LTE.

Figure 3C:
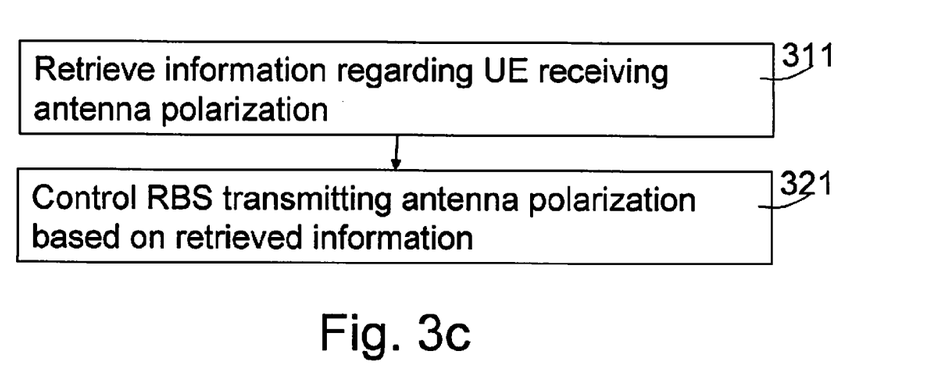

Furthermore, FIG. 3c is a flowchart for the method of the scheduling unit, according to a third embodiment of the present invention. In this embodiment the purpose is to allocate resources to the UEs for the downlink transmission. The method comprises the step of retrieving 311 information regarding the polarization of the UE receiving antenna (or antennas) and the step of controlling 321 the RBS transmission antenna polarization based on the retrieved information. If the UE receiving antenna polarization is vertically polarized for example, it should be ensured that a VP RBS transmission antenna is used for the transmission. This control of the RBS transmission antenna polarization will in the example of a CoMP system imply that weights or so called pre-coding vectors are applied to the transmitting antennas. As there are more than one RBS antennas transmitting the signal to the UE, the combined signal at the UE can be given the wanted polarization by applying weights to the transmitting antennas.

Figure 3D:
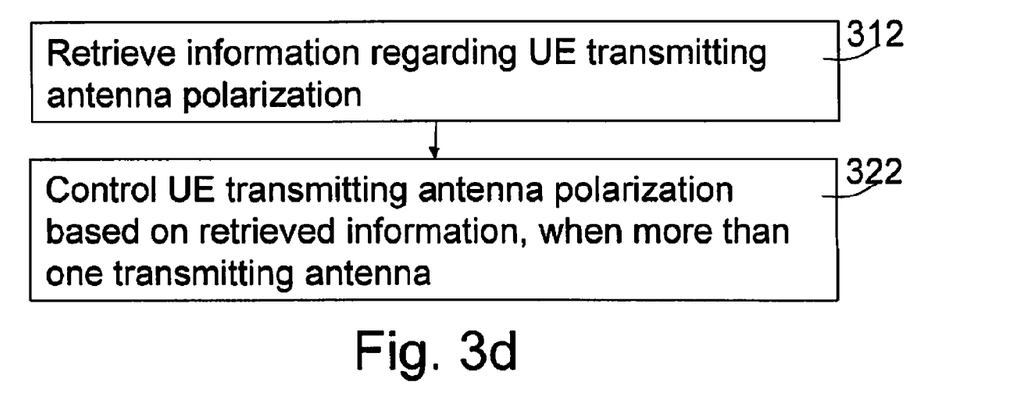

FIG. 3d is a flowchart for the method of the scheduling unit, according to a fourth embodiment of the present invention. In this embodiment the purpose is to allocate resources to the UEs for the uplink transmission when there are more than one UE transmitting antenna. The method comprises the steps of retrieving 312 information regarding the polarization of the UE transmitting antennas and controlling 322 the UE transmitting antenna polarization based on the retrieved information. Also this may be done by applying weights to the transmitting antennas.

Figure 4A:
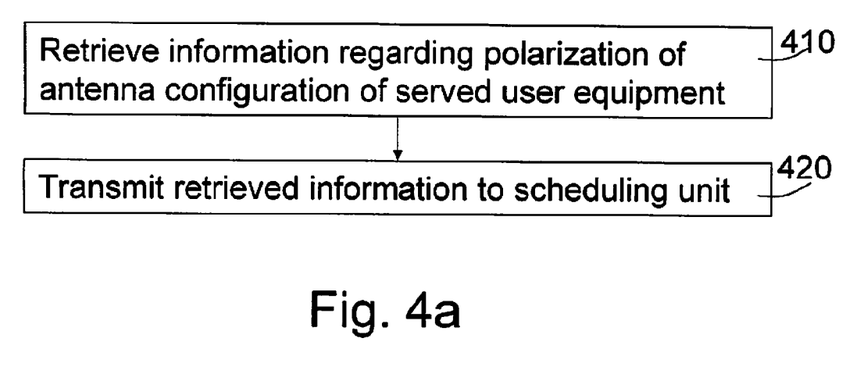
FIGS. 4a-b are flowcharts of the methods performed by the RBS according to embodiments of the present invention.

FIG. 4a is a flowchart for the method performed by the RBS, according to an embodiment of the present invention. In this embodiment it is the RBS that retrieves information about the polarization of the UE antenna configuration, either continuously or upon a request from the scheduling unit. The method comprises the steps of retrieving 410 information regarding the polarization of the antenna configurations of served UEs, and transmitting 420 the retrieved information to the scheduling unit responsible for the allocation of resources of these served UEs.

Figure 4B:
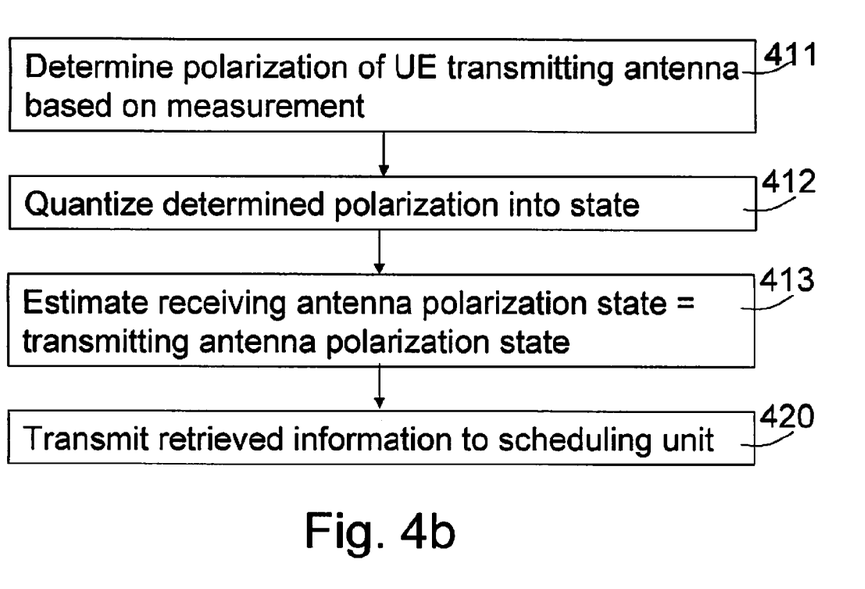

FIG. 4b is a flowchart for the method of the RBS, according to another embodiment of the present invention. It comprises the steps of retrieving 411 information regarding the polarization of the transmitting antenna of served UEs, and of quantizing 412 it into a polarization state. This information can be used by the scheduling unit to allocate resources for the uplink transmission. The method also comprises the step of estimating 413 the receiving antenna polarization state to be equal to the transmitting antenna polarization state. This estimation is good if the same antennas are used as transmitting and receiving antennas, and can be used by the scheduling unit to allocate resources for the downlink transmission. In step 420, the retrieved information is transmitted to the scheduling unit.

Figure 5A:
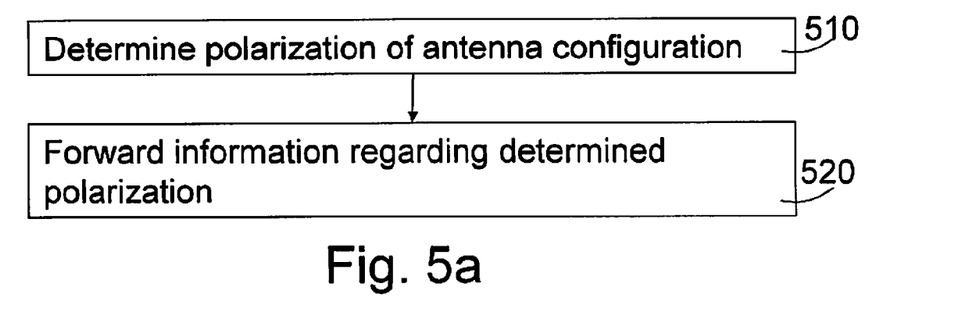
FIGS. 5a-b are flowcharts of the methods performed by the UE according to embodiments of the present invention.

FIG. 5a is a flowchart for the method of the UE, according to an embodiment of the present invention. In this embodiment it is the UE that determines information about the polarization of its antenna configuration, either continuously or upon a request from the scheduling unit. The method comprises the steps of determining 510 the polarization of the antenna configuration, and forwarding 520 the determined polarization to the scheduling unit. If the scheduling unit is co-located with the RBS, then the forwarding comprises the transmission over the air interface to the scheduling unit. The scheduling unit could also be co-located with the UE, and the forwarding will then not involve the RBS.

Figure 5B:
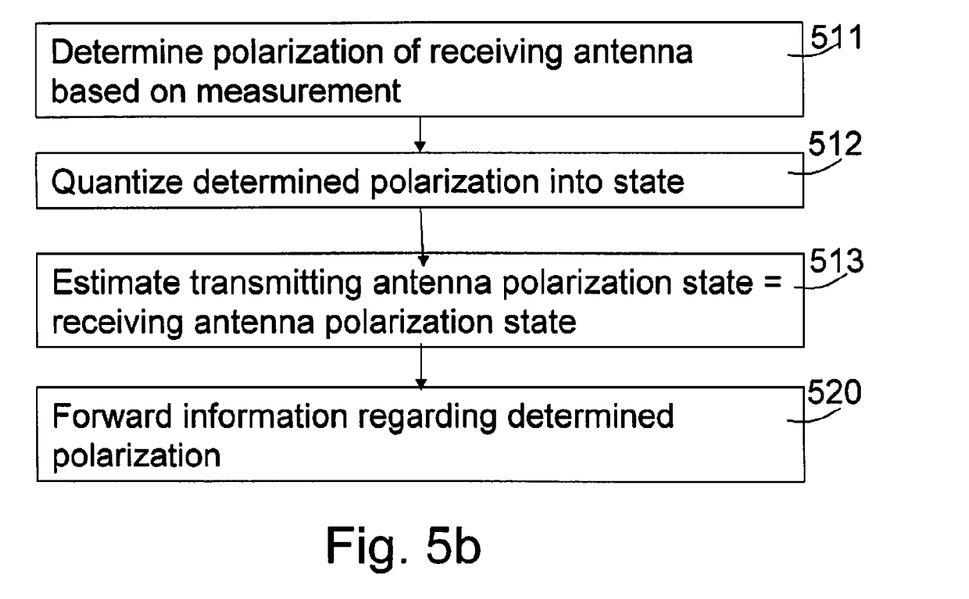

FIG. 5b is a flowchart for the method of the UE, according to another embodiment of the present invention. It comprises the steps of determining 511 the polarization of the UE receiving antenna, and of quantizing 512 it into a polarization state. The polarization state may be one of the two states VP state and HP state. Additional states may also be added, as the mixed polarization state for a polarization that is a mixture of HP and VP or a state that is not persistent over time or frequency, and the either polarization state if there are more than one antenna that offer the possibility to use either VP or HP. The polarization state can be used by the scheduling unit to allocate resources for the downlink transmission. The method also comprises the step of estimating 513 the transmission antenna polarization state to be equal to the receiving antenna polarization state. In step 520, the determined polarization state is forwarded to the scheduling unit.

Figure 6A:
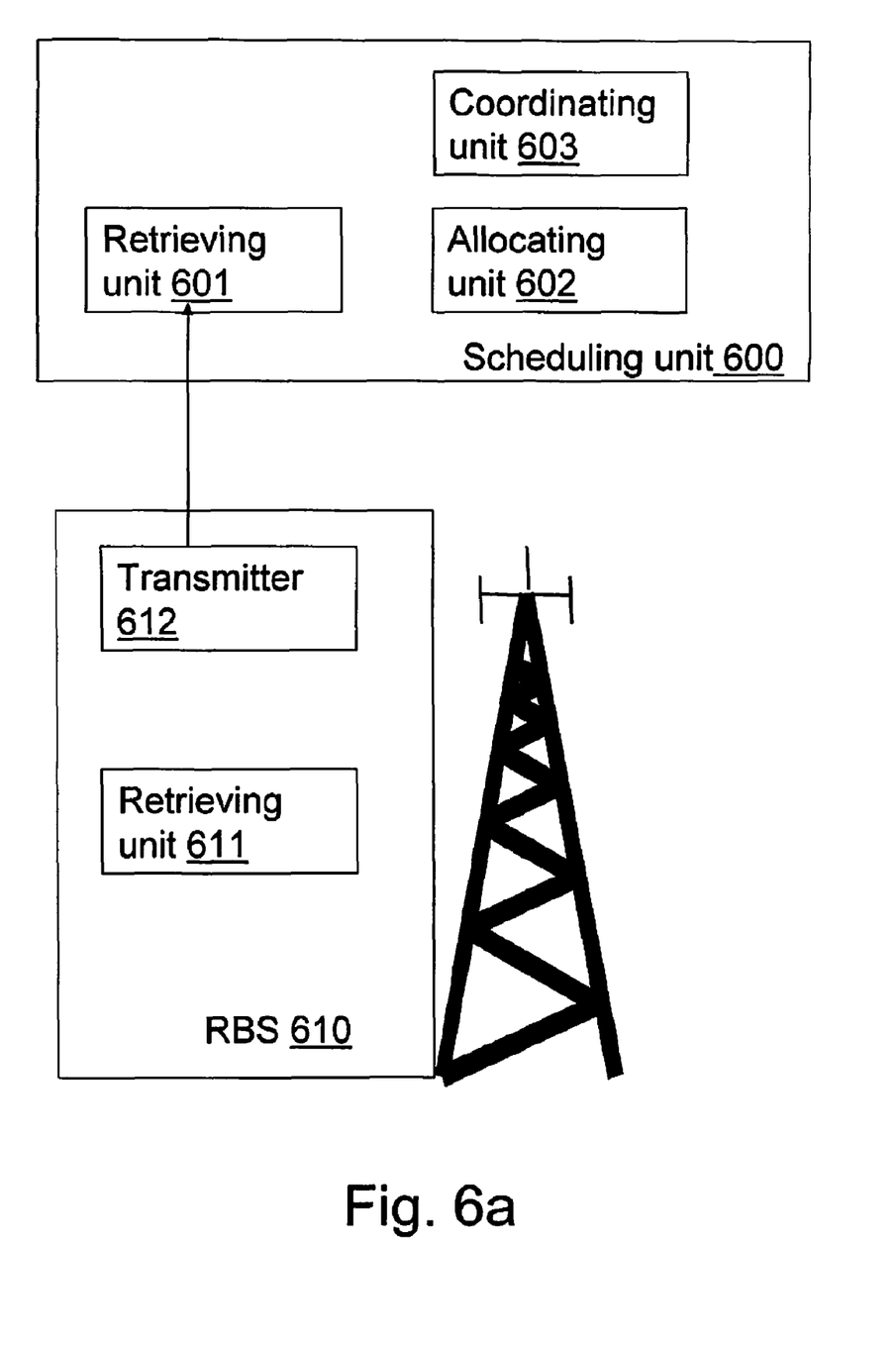
FIG. 6a illustrates schematically the scheduling unit and the RBS according to embodiments of the present invention.

Schematically illustrated in FIG. 6a and according to one embodiment of the present invention, is the scheduling unit 600. It comprises a retrieving unit 601 for retrieving information regarding the polarization of the antenna configuration of at least two UEs. It also comprises an allocating unit 602 for allocating resources to the UEs based on the retrieved polarization information. Furthermore, it comprises a coordinating unit 603 for coordinating the allocation of resources with a second scheduling unit when the UEs are controlled by more than one scheduling unit. The scheduling unit 600 is in this embodiment co-located with an RBS, but it may also be co-located with a UE (for UE coordinated scheduling) or in a separate node such as the Radio Network Controller in UTRAN.

Also illustrated in FIG. 6a and according to one embodiment of the present invention, is the RBS 610. It comprises a retrieving unit 611 for retrieving information regarding the polarization of the antenna configurations of the served UEs, and a transmitter 612 for transmitting the retrieved information to the scheduling unit.

Figure 6B:
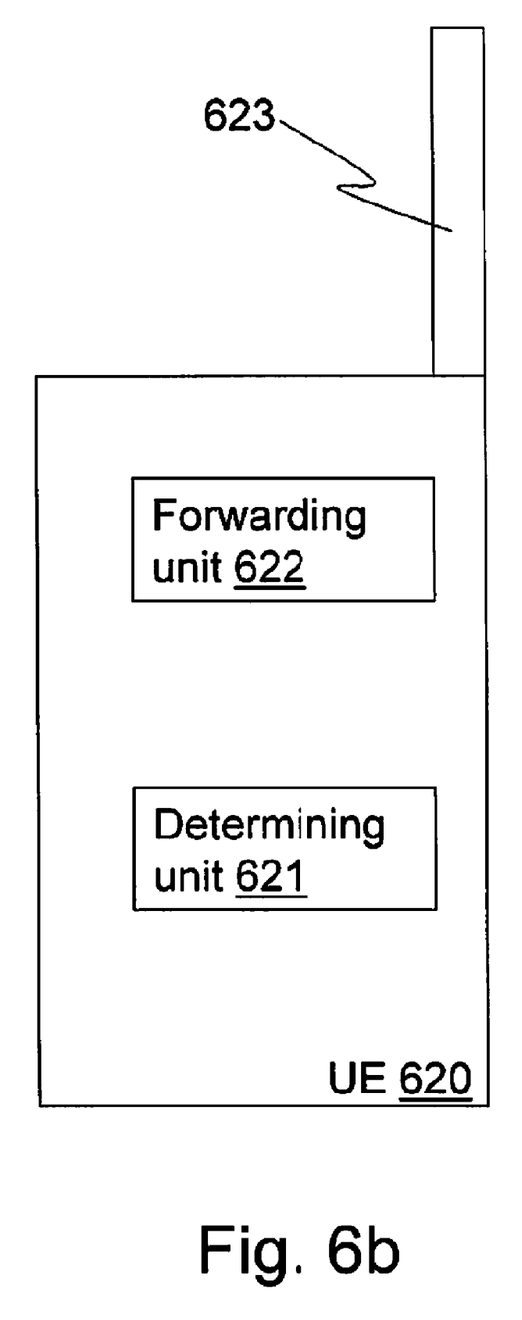
FIG. 6b illustrates schematically the UE according to embodiments of the present invention.

Schematically illustrated in FIG. 6b and according to one embodiment of the present invention, is the UE 620. It comprises a determining unit 621 for determining the polarization of the antennas of the antenna configuration 623. It also comprises a forwarding unit 622 for forwarding the determined polarization to the scheduling unit.

The above mentioned and described embodiments are only given as examples and should not be limiting to the present invention. Other solutions, uses, objectives, and functions within the scope of the invention as claimed in the accompanying patent claims should be apparent for the person skilled in the art.

ABBREVIATIONS

3GPP 3$^{rd}$ Generation Partnership Project
ASIC Application Specific Integrated Circuit
CoMP Coordinated multi-point transmission or reception
E-UTRAN Evolved UTRAN
FDM Frequency Division Multiplexing
HP Horizontal polarization
ICIC Inter-cell interference coordination
LTE Long Term Evolution
MIMO Multiple-Input Multiple-Output
PMI Pre-coding Matrix Indicator
RBS Radio Base Station
TDM Time Division Multiplexing
UE User Equipment
UMTS Universal Mobile Telecommunication System
UTRAN UMTS Terrestrial Radio Access Network
VP Vertical polarization

The invention claimed is:

1. A method for resource allocation in a wireless communication system comprising a first radio base station serving a plurality of user equipments, each user equipment provided with an antenna configuration comprising a transmitting and a receiving antenna, and a first scheduling unit that controls the allocation of radio resources for use by the first radio base station to said the user equipments, said method comprising the following steps, performed by a the first scheduling unit, comprising: retrieving information regarding polarization of the antenna configuration of at least two of the user equipments; allocating resources for the at least two user equipments responsive to the information; and coordinating with a second scheduling unit, responsive to the information, the allocation of radio resources by the second scheduling unit associated with a second radio base station to serve a plurality of user equipments.

2. The method according to claim 1, wherein:
the step of retrieving information regarding the polarization of the antenna configuration comprises the sub step of retrieving information regarding the polarization of the receiving at least one antenna of said antenna configuration, and
the step of allocating resources comprises the sub step of controlling polarization of the transmitting at least one antenna of at least one the first radio base station serving said at least two user equipments responsive to the retrieved information.

3. The method according to claim 1, wherein:
the antenna configuration of said at least two user equipments comprises at least one additional transmitting antenna,
the step of retrieving information regarding the polarization of the antenna configuration comprises the sub step of retrieving information regarding the polarization of each of the transmitting antennas of said antenna configuration, and
the step of allocating resources comprises the sub step of controlling the transmitting antenna polarizations of said at least two user equipments responsive to the retrieved information.

4. The method according to claim 2, wherein the sub step of controlling polarization of the transmitting at least one antenna comprises applying transmitting antenna weights.

5. The method according to claim 1, wherein the step of allocating resources comprises the sub step of scheduling two of said at least two user equipments having substantially orthogonal antenna polarizations in the same time or frequency resource.

6. A method for resource allocation in a wireless communication system comprising a first radio base station serving a plurality of user equipments, each user equipment provided with an antenna configuration comprising a transmitting antenna and a receiving antenna, wherein at least one scheduling unit controls the allocation of radio resources to said user equipments, the method, performed by the first radio base station, comprising:
retrieving information regarding polarization of the antenna configuration of at least two of the served user equipments;
transmitting the information to a scheduling unit to cause the scheduling unit to use the information when allocating resources; and
coordinating with a second radio base station, responsive to the information, the allocation of radio resources by a second scheduling unit associated with the second radio base station to serve a plurality of user equipments.

7. The method according to claim 6, wherein the step of retrieving information regarding the polarization of the antenna configuration comprises the sub steps of:
determining the polarization of the transmitting antenna of said antenna configuration responsive to a measurement of the uplink signal strength for each receiving antenna of the first radio base station, and
quantizing the polarization into one of at least two possible polarization states.

8. The method according to claim 7, wherein the step of retrieving information regarding the polarization of the antenna configuration comprises the further sub step of estimating the polarization state of the receiving antenna of said antenna configuration to be equal to the polarization state of the transmitting antenna of said antenna configuration.

9. The method according to claim 7, wherein the measurement of the uplink signal strength for each receiving antenna of the first radio base station is performed for at least two frequencies.

10. The method according to claim 6, wherein the information regarding the polarization of the antenna configuration is retrieved from each of the served user equipments.

11. The method according to claim 6, wherein the steps of retrieving information regarding the polarization of the antenna configuration and transmitting the retrieved information are performed at regular intervals, or in response to a query from a scheduling unit, or when a defined event occurs.

12. A method for resource allocation in a wireless communication system comprising at least one radio base station serving a plurality of user equipments, each user equipment provided with an antenna configuration comprising a transmitting and a receiving antenna, wherein at least one scheduling unit controls the allocation of radio resources to said user equipments, said method, performed by each of the user equipments, comprising:
determining polarization of the antenna configuration; and
forwarding information regarding the polarization to a scheduling unit, to cause the scheduling unit to use the information when allocating resources,
wherein the information regarding the polarization is forwarded by the user equipment through a pre-coding matrix indicator (PMI) of a 3GPP Long Term Evolution (LTE) communication to a serving radio base station for forwarding to the scheduling unit.

13. The method according to claim 12, wherein the step of determining the polarization of the antenna configuration comprises the sub steps of:
determining the polarization of the receiving antenna of said antenna configuration responsive to a measurement of a serving radio base station transmitting antenna specific pilots, and
quantizing the polarization into one of at least two possible polarization states, said possible polarization states comprising a vertical polarization state and a horizontal polarization state.

14. The method according to claim 13, wherein said possible polarization states further comprises a mixed polarization state or only one of the vertical and horizontal polarization states.

15. The method according to claim 13, wherein the step of determining the polarization of the antenna configuration comprises the further sub step of estimating the polarization state of the transmitting antenna of said antenna configuration to be equal to the polarization state of the receiving antenna of said antenna configuration.

16. The method according to claim 13, wherein the measurement of the serving radio base station transmitting antenna specific pilots is performed for at least two frequencies.

17. The method according to claim 12, wherein the steps of determining the polarization of the antenna configuration and forwarding information regarding the polarization are performed at regular intervals, or in response to a query from the scheduling unit, or when a defined event occurs.

18. A scheduling unit for a wireless communication system, the wireless communication system comprising a first radio base station serving a plurality of user equipments, each user equipment provided with an antenna configuration comprising a transmitting and a receiving antenna, the scheduling unit arranged to control the allocation of radio resources between the first radio base station and the plurality of user equipments and comprises:
a retrieving unit for retrieving information regarding the polarization of the antenna configuration of at least two of the user equipments; an allocating unit for allocating resources for said the at least two user equipments responsive to the information; and coordinating with a second scheduling unit, responsive to the information, the allocation of radio resources by the second scheduling unit associated with a second radio base station to serve a plurality of user equipments.

19. The scheduling unit according to claim 18, further comprising a coordinating unit for coordinating the allocation of resources with a second scheduling unit responsive to the retrieved information, when more than one scheduling unit controls the allocation of resources to said at least two user equipments.

20. The scheduling unit according to claim 18, wherein:
the retrieving unit is arranged to retrieve information regarding the polarization of the receiving at least one antenna of said antenna configuration, and
the allocating unit is arranged to control the transmitting antenna polarization(s) of at least one radio base station serving said at least two user equipments responsive to the retrieved information.

21. The scheduling unit according to claim 18, wherein:
the antenna configuration of said at least two user equipments comprises at least one additional transmitting antenna,
the retrieving unit is arranged to retrieve information regarding the polarization of each of the transmitting antennas of said antenna configuration, and
the allocating unit is arranged to control the transmitting antenna polarization(s) of said at least two user equipments responsive to the retrieved information.

22. The scheduling unit according to claim 20, wherein the control of the transmitting antenna polarization comprises applying transmitting antenna weights.

23. The scheduling unit according to claim 18, wherein the allocating unit is arranged to schedule two of said at least two user equipments having substantially orthogonal antenna polarizations in the same time or frequency resource.

24. A radio base station for a wireless communication system, said wireless communication system comprising a first scheduling unit controlling the allocation of radio resources to a plurality of user equipments, each user equipment provided with an antenna configuration comprising a transmitting and a receiving antenna, the radio base station arranged to serve the user equipments and comprises:
a retrieving unit for retrieving information regarding polarization of the antenna configuration of at least two of the user equipments;
a transmitter for transmitting the information to the first scheduling unit to cause the first scheduling unit to use the retrieved information when allocating resources; and
coordinating through a second radio base station, responsive to the information, the allocation of radio resources by a second scheduling unit associated with the second radio base station to serve a plurality of user equipments.

25. The radio base station according to claim 24, wherein the retrieving unit is arranged to:
determine the polarization of the transmitting antenna of said antenna configuration responsive to a measurement of the uplink signal strength for each radio base station receiving antenna, and
quantize the polarization into one of at least two possible polarization states.

26. The radio base station according to claim 25, wherein the retrieving unit is further arranged to estimate the polarization state of the receiving antenna of said antenna configuration to be equal to the polarization state of the transmitting antenna of said antenna configuration.

27. The radio base station according to claim 24, wherein the measurement of the uplink signal strength for each radio base station receiving antenna is performed for at least two frequencies.

28. The radio base station according to claim 24, wherein the retrieving unit is arranged to retrieve the information from each of the served user equipments.

29. A user equipment for a wireless communication system, the wireless communication system comprising at least one radio base station serving a plurality of user equipments and at least one scheduling unit controlling the allocation of radio resources to the user equipments of the system, said user equipment provided with an antenna configuration comprising a transmitting antenna and a receiving antenna, and each of the user equipments further comprises:
a determining unit for determining polarization of the antenna configuration, and
a forwarding unit for forwarding information regarding the polarization to a scheduling unit, to cause the scheduling unit to use the information when allocating resources,
wherein the information regarding the polarization is forwarded by the user equipment through a pre-coding matrix indicator (PMI) of a 3GPP Long Term Evolution (LTE) communication to a serving radio base station for forwarding to the scheduling unit.

30. The user equipment according to claim 29, wherein the determining unit is arranged to:
determine the polarization of the receiving antenna of said antenna configuration responsive to a measurement of a serving radio base station transmitting antenna specific pilots, and
quantize the polarization into one of at least two possible polarization states, said polarization states comprising a vertical polarization state and a horizontal polarization state.

31. The user equipment according to claim 30, wherein said polarization states further comprises a mixed polarization state or only one of the vertical and horizontal polarization states.

32. The user equipment according to claim 30, wherein the determining unit is arranged to estimate the polarization state of the transmitting antenna of said antenna configuration to be equal to the polarization state of the receiving antenna of said antenna configuration.

33. The user equipment according to claim 30, wherein the measurement of the serving radio base station transmitting antenna specific pilots is performed for at least two frequencies.

34. The method according to claim 1,
wherein retrieving information regarding polarization of the antenna configuration of the user equipments comprises receiving the information regarding the polarization from the user equipments via the first radio base station using a pre-coding matrix indicator (PMI) according to 3GPP Long Term Evolution (LTE).

* * * * *

UNITED STATES PATENT AND TRADEMARK OFFICE
CERTIFICATE OF CORRECTION

| | | |
|---|---|---|
| PATENT NO. | : 8,320,926 B2 | Page 1 of 1 |
| APPLICATION NO. | : 13/265945 | |
| DATED | : November 27, 2012 | |
| INVENTOR(S) | : Hagerman et al. | |

It is certified that error appears in the above-identified patent and that said Letters Patent is hereby corrected as shown below:

In Column 1, Line 8, delete "No," and insert -- No. --, therefor.

In Column 12, Line 65, in Claim 2, delete "of at least one the" and insert -- of the --, therefor.

Signed and Sealed this
Ninth Day of April, 2013

Teresa Stanek Rea
*Acting Director of the United States Patent and Trademark Office*